I. ALLEN.
DEVICE FOR WATERING STOCK.
No. 186,094. Patented Jan. 9, 1877.
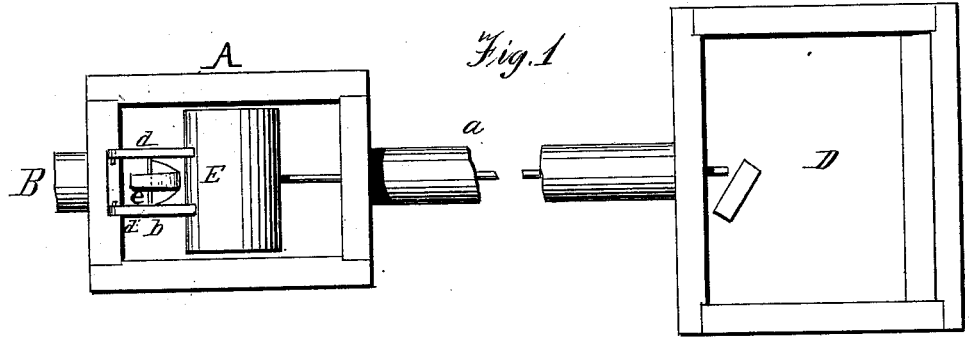
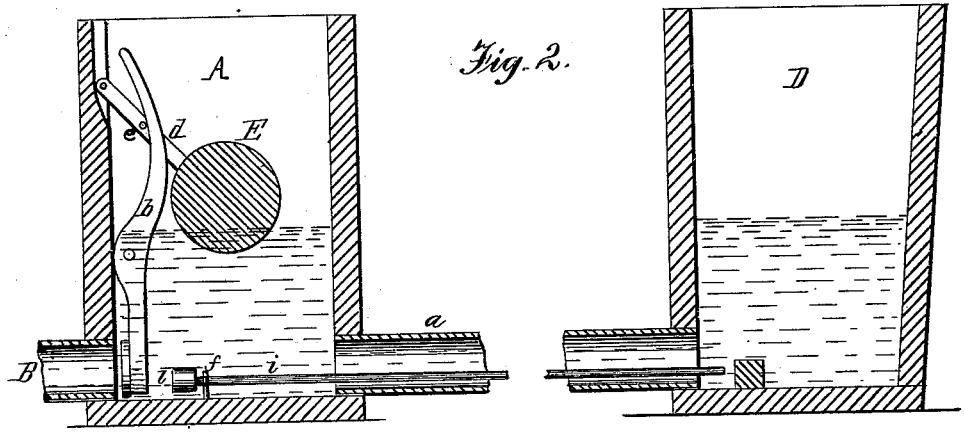
Witnesses
Grenville Lewis
Chas. O. Gill
Inventor
Isaac Allen
by his attys.
Cox and Cox

UNITED STATES PATENT OFFICE.

ISAAC ALLEN, OF LA BELLE, MISSOURI.

IMPROVEMENT IN DEVICES FOR WATERING STOCK.

Specification forming part of Letters Patent No. 186,094, dated January 9, 1877; application filed June 16, 1876.

*To all whom it may concern:*

Be it known that I, ISAAC ALLEN, of La Belle, in the county of Lewis and State of Missouri, have invented a new and useful Improvement in Devices for Watering Stock, of which the following is a specification, reference being had to the accompanying drawings.

The invention relates to an improvement in devices for watering stock; and consists in the mechanism hereinafter described, the object being to furnish a device for carrying water from a pond or stream to a tank, out of which the cattle may drink.

Figure 1 is a top view of a device embodying the elements of the invention. Fig. 2 is a central vertical longitudinal section of same.

In the accompanying drawings, A represents a tank, which is designed to be embedded in the earth near a reservoir, stream, or pond, for the purpose hereinafter displayed, and is provided on its rear end with the induction-pipe B, which extends to the stream or pond, and is below the surface of the same, so that the water will pass readily through this pipe into the tank A, whence it flows through the connecting-pipe $a$ into the drinking vessel or tank D, which is of suitable construction, and placed so as to be easy of access.

In the rear end of the interior of the tank A is centrally pivoted the lever $b$, having its lower portion extending downward, and provided with a pad of suitable material, which fits over the end of the induction-pipe B, forming a valve. The other end of the lever $b$ extends upward, and is curved inward and then outward, constituting a concave incline, up which the float E rides when forced upward by the water pressing against its under surface.

This float may be of any desirable size and material, and is provided with the arms $d$, pivoted to the rear end of the tank, and provided, about midway of their length, with the cross-bar $e$, which moves upon the upper portion of the lever $b$.

In the bottom of the tank A is secured the standard $f$, in the upper end of which the rod $i$ is journaled, its rear end being provided with the packing $l$, and its forward end extending through the connecting-pipe $a$ into the tank D. This rod is employed to force the lower end of the lever $b$ against the pipe B, preventing the influx of water to the tank A. An aperture is provided in the side of the tank A to permit the escape of surplus water. An aperture may be provided in the base of the tank D for the purpose, when opened, of draining or emptying both tanks.

It is obvious that, the device being properly placed, water would enter the pipe B, and raise the float gradually as the tank is being filled, until the cross-bar $e$ comes in contact with the outward curve of the lever $b$. This causes the lower end of the lever and end of pipe B to collapse, preventing any water from coming in the tank.

It is also obvious that the tank A, being buried in the earth, will not freeze in winter, and will keep cool in summer—a very great advantage for stock-dealers.

What I claim as my invention, and desire to secure by Letters Patent, is—

1. In a device for watering stock, the float E, provided with the arms $d$ and cross-bar $e$, in combination with the lever $b$, substantially as set forth.

2. In a device for watering stock, the tanks A and D, connected by the pipe $a$, the former being embedded in the earth and containing the valve mechanism, and the latter serving as a drinking vessel or reservoir, when arranged substantially as and for the purpose shown and described.

3. The combination of the float E, cross-bar $e$, and lever $b$, substantially as set forth.

4. The rod $i$, mounted in the standard $f$, and provided with the packing $l$, in combination with the lever $b$ and pipe B, for the purpose set forth.

In testimony that I claim the foregoing improvement in devices for watering stock, as above described, I have hereunto set my hand.

ISAAC ALLEN.

Witnesses:
W. F. HALDEMAN,
JACOB HALDEMAN.